INVENTORS
DENNIS M. SWING
LLOYD A. DRAKE
HARLAN W. BATES
BY
ATTORNEY

3,515,894
STANDBY CONTROL SYSTEM
Dennis M. Swing, Laguna Hills, Calif., and Lloyd A. Drake and Harlan W. Bates, Columbus, Ohio, assignors to Solidstate Controls, Inc., a corporation of Ohio
Filed Mar. 12, 1969, Ser. No. 806,614
Int. Cl. H02j 7/00, 3/00
U.S. Cl. 307—64        11 Claims

ABSTRACT OF THE DISCLOSURE

A system for maintaining continuous power to a critical load. Specifically, there is disclosed circuitry which will provide a power source whose frequency remains within predetermined acceleration and phase limits. Reference is made to the claims for a legal definition of the invention.

BACKGROUND

The technology of today has advanced to the point where there are many types of electrical loads which require a continuous source of power. As an example, there are electronic computers which will generate output errors if the computer's input fails for as much as one cycle.

In addition to the continuity of the power supply many applications require that the phase and frequency of the supply meet certain specifications. The static inverter functioning as the primary power supply should not accelerate in frequency at a rate greater than that to which the load can adjust. The static inverter must not follow a reference which is operating outside of the allowable frequency limits. Also the phase difference between the reference and the primary source must be maintained at a minimum value so that no damage would occur in switching from the primary source to the reference source in the event of a deterioration or failure of the primary.

Meeting these specifications under the prior art was very difficult; this difficulty was compounded by several factors. In determining the acceleration rate of the relative frequencies, there must first be some means to identify the individual sine wave signals of the reference and the primary sources. Since by definition it is desirable to have these two sources as much identical as possible, their identification is not a simple matter.

Another problem is the stability of the entire system. Allowance must be made for erratic signals and cumulative small drifting of components and sources. In the prior art these requirements were met, if at all, with very complex and expensive equipment.

SUMMARY

The present invention relates to a system for maintaining a continuous power supply, with the necessary operating parameters, to a critical load. This capability is achieved by first assuring that the reference source is within predetermined frequency limits. This reference source's frequency is then compared with the output frequency of the primary source to determine the relative acceleration of the frequency of the two sources. Correction is provided to adjust the primary frequency to that of the reference frequency.

When the two frequencies are within a predetermined value of each other they are then monitored until the phase difference of the two signals is within a predetermined value. Assuming that the desired phase coincidence occurs, the primary source becomes synchronized to the reference source. This synchronization is a soft-lock synchronization which permits the primary source to cease following the reference source if there is a gross change in the reference source's characteristics.

The relative acceleration of the frequencies of the two sources is achieved by a combination of wave shaping and logic circuitry. The system utilizes a stepping motor which provides absolute stability.

OBJECTS

Accordingly it is a principal object of the present invention to provide an improved standby control system.

Another object of the invention is to provide a standby control system which permits stable operation.

A further object of the invention is to provide a standby control system which assures continuous power to a critical load by a simple and inexpensive means.

Still a further object of the invention is to provide a standby control system which permits determination of the relative acceleration of two source's frequencies.

For a complete understanding of the invention, together with other objects and advantages thereof, reference may be made to the accompanying drawings, in which:

DESCRIPTION OF THE PREFERRED EMBODIMENT

Figure 1:
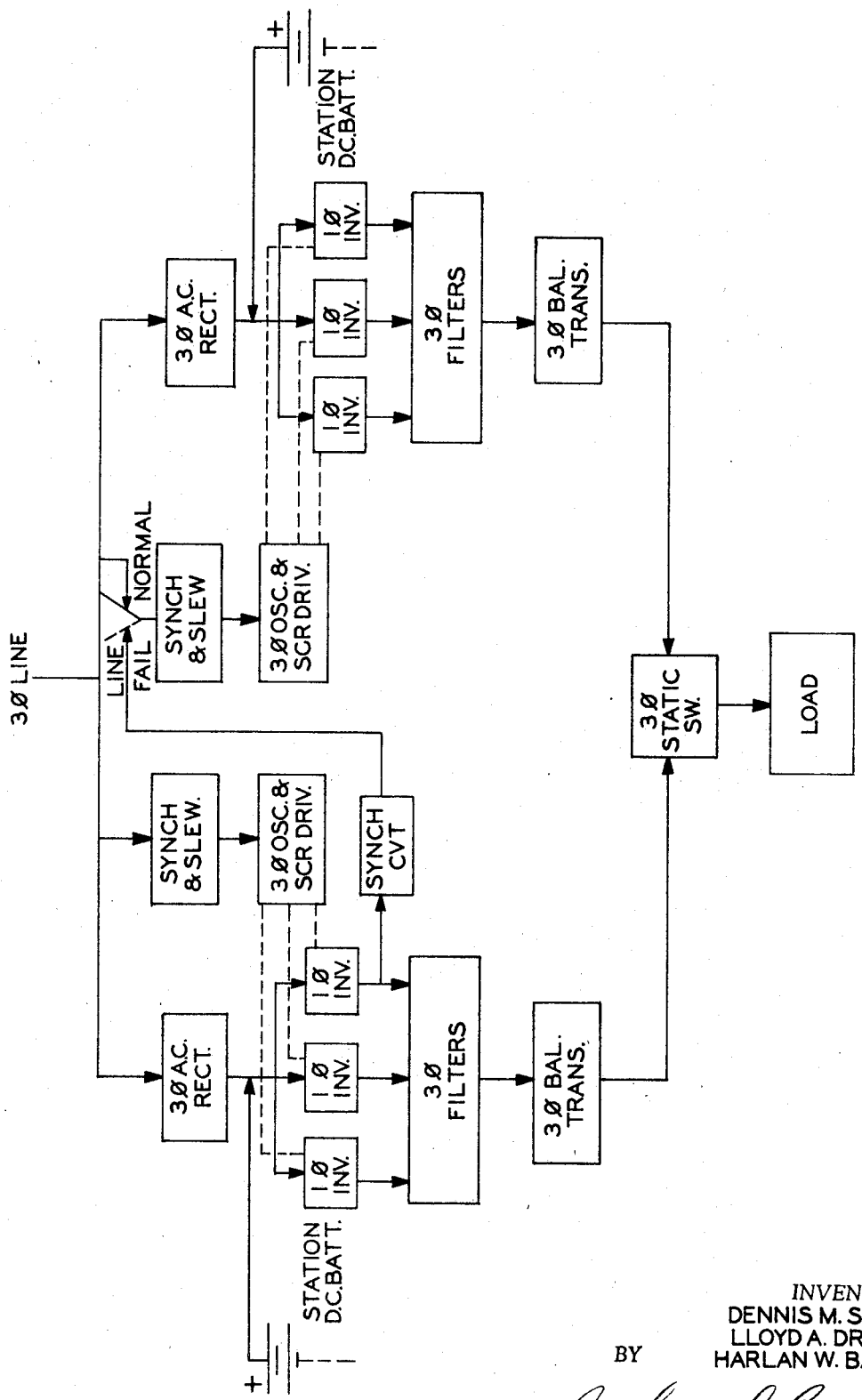
FIG. 1 is a block diagram representation of a system utilizing the preferred embodiment of the invention.

Referring now to FIG. 1 there is illustrated in block form a system incorporating the preferred embodiment of the invention. This system provides a critical load with a standby source of power in the event the primary source were to fail.

Of principal importance is the control block labeled "synch and slew," wherein "slew" is defined as the making a frequency correction which ultimately results in a synchronization. This block contains within it the components necessary to regulate the frequency and to maintain synchronization with the reference source by controlling the static inverter.

For purposes of discussion, it will be assumed that the critical load has the following crucial requirements:

(1) The static inverter shall not accelerate in frequency $(df/dt)$ at a rate in excess of 0.035 Hz./sec.$^2$ when:
   (a) free running (no reference source);
   (b) attempting to follow a changing reference source frequency; and,
   (c) resynchronizing to a reference source which has momentarily failed.

(2) Under steady state synchronizing conditions, a phase angle change can occur at any rate of change $(d\varphi/dt)$ as long as the phase error does not exceed $+90°$ from the reference.

(3) The static inverter shall not synchronize to a reference source whose frequency is outside the band of $60\pm0.5$ Hz. and shall not follow the reference beyond these limits if previously synchronized.

(4) Under steady state conditions, the static inverter output shall be phase synchronized to the reference source within a bandwidth of $\pm10$ electrical degrees or less to facilitate static switching to the reference source in the event of inverter failure.

It is to be understood that the above specifications are representative only and that the teachings of the invention encompass other frequency and phase angle requirements. It is the means of dealing with these requirements which is of importance, the specified limits having no significance in and of themselves.

Figure 2:
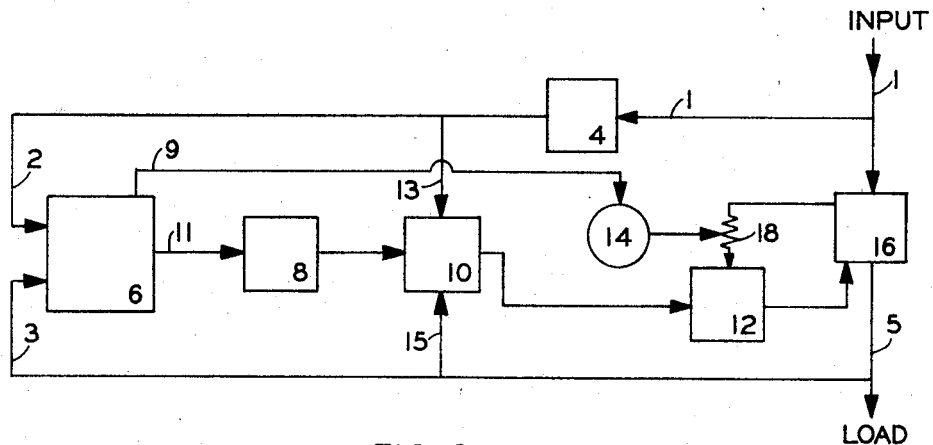
FIG. 2 is a block diagram representation of the details of the "synch and slew" block illustrated in FIG. 1.

A more detailed understanding of the "synch and slew" block of FIG. 1 can be had by referring to FIG. 2. Shown in FIG. 2 are the basic component blocks which give the desired performance. The input 1 from the reference source passes through the frequency detector block 4 to the error direction detector block 6 only if the reference frequency is within the desired limits. This is a standard block which measures the frequency of the reference source to determine if it is within the desired outer limits (in the example this means within ±0.5 Hz. of 60 Hz.). If the situation is such that the input 1 is out of limits the reference source is switched out of the circuit and the secondary power source operates at its own free running frequency until such time as the reference source comes back within the limits.

Assuming that the reference is within limits (that is, condition 3 is satisfied) the input 1 is fed to the error direction detector block 6 (input 2). The details of the block's makeup will be discussed at a later point. The function of block 6 is to determine whether the reference source's frequency is high or low with respect to the output 5. To make this determination the error direction detector block 6 is fed an input 3 from the output 5 of the system's inverter 16. This output 5 provides the supply to the load.

The error direction block 6 compares the reference input 2 frequency with the input 3 frequency from the inverter 16. Based on this comparison there is emitted simultaneously a frequency correction signal 9 and a timer reset signal 11. The frequency correction signal 9 contains information concerning the direction of the reference source's frequency error. This information is supplied to a motor 14. The motor 14 controls a variable potentiometer 18. The direction of rotation of the motor 14 is dependent upon the direction of the reference source's frequency error as related by the frequency correction signal 9. The potentiometer 18 functions as a control on the synchronization block 12.

The motor 14 upon actuation will turn the potentiometer 18 a small predetermined amount, regardless of the error magnitude and in a direction to reduce the error. The motor 14 will remain quiescent until the next frequency correction signal 9 is received. The motor 14, therefore, is a passive device which affords absolute stability in the system. The response of the motor is chosen so that there will be no overlap between successive signals 9 from the error direction detector 6.

The synchronization block 12 is not energized if the reference frequency is out of the limits set by condition 3 or if the error correction operations described above are too frequent.

The reset signal 11 is connected to a timer 8. The delay time chosen for the timer 8 is determined by the maximum permissible acceleration rate. In the example the maximum rate was stated in condition 1 to be 0.035 Hz./sec.$^2$. At this rate it would take approximately 14 seconds for the frequency to move from the desired 60 Hz. to the upper (60.5 Hz.) or the lower (59.5 Hz.) limit. Assuming the worse situation, where the frequency changes from one extreme to the other, it would take approximately 28 seconds for the change at the maximum permissible rate.

Therefore the delay time of the timer 8 is chosen to be 30 seconds. This allows adequate protection because any change of frequency which takes longer than 28 seconds would necessarily be within the allowable acceleration rate.

Assuming 30 seconds pass without a reset signal 11 and a frequency correction signal 9 being emitted by the error direction detector 6, the timer 8 will actuate the null detector 10. The null detector 10 compares the phase of the signal 13 from the reference source and the phase of a signal 15 from the inverter's 16 output 5. When a phase null exists the synchronization circuit 12 will be actuated and the inverter 16 will be synchronized with the reference source.

Once the synchronization circuit 12 is energized, the error direction detector 6 will be de-energized and will not supply an output unless there is sufficient "strain" between the two frequencies to break phase null (approximately ±.3 Hz. B.W.) whereupon the whole slewing and synching process repeats.

Figure 3:
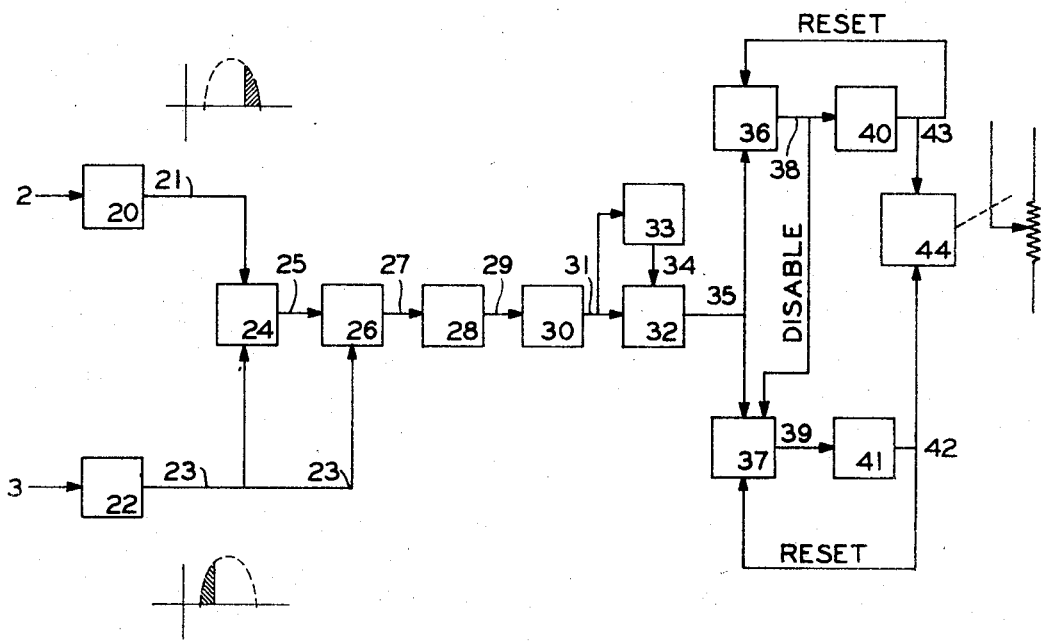
FIG. 3 is a block diagram representation of the "error direction detector" block illustrated in FIG. 2.

Referring now to FIG. 3 there is illustrated in block form the basic components in the error direction detector block 6 of FIG 2. The function of the error direction detector 6 is to measure the frequencies and to determine whether the frequency of the inverter output 5 is increasing or decreasing in frequency relative to the frequency of the reference source. This determination is made difficult by the symmetry of the sine waves from the reference source and the inverter 16. Identification and separation of the two signals must be accomplished before the relative frequency can be determined. Absolute frequency of either source is not important to the error direction detector 6; only the difference and identification of which source's frequency is higher and which is lower.

To give each output an identity, the signals 2 and 3 are first processed by individual pulse forming circuitry. The signal 2 from the reference source 1 is rectified with only the positive one-half of the sine wave being retained. This rectification occurs within block 20 of FIG. 3. Block 20 is a pulse forming circuit which by a conventional use of a silicon controlled rectifier (SCR) permits only the "trailing edge" of the positive one-half of the reference signal 2 to pass. The resulting waveshape is shown in FIG. 3 as the output 21 of block 20.

The signal 3 from the inverter output 5 is rectified with only the positive one-half of the sine wave being retained. This rectification occurs within block 22 of FIG. 3. Block 22 is a pulse forming circuit which permits only the "leading edge" of the positive one-half of the signal's 3 sine wave to pass. The resulting waveform is shown in FIG. 3 as output 23 from block 22.

Outputs 21 and 23 are fed into block 24. Block 24 is an "and" circuit which provides an output 25 for the period of time both waveshapes are simultaneously present. An output 25 from this circuit "arms" the level gate circuit 26 which, for the period it is armed (input 25), passes the input waveshape 23 and output 27 to the 100 μsec. delay circuit 28. The effect of this circuit is to chop the first 100 μsec. off the waveform to be passed to eliminate indeterminate information which might be on the leading edge. This still leaves 90% of the 1 millisec. waveform.

Figure 4:
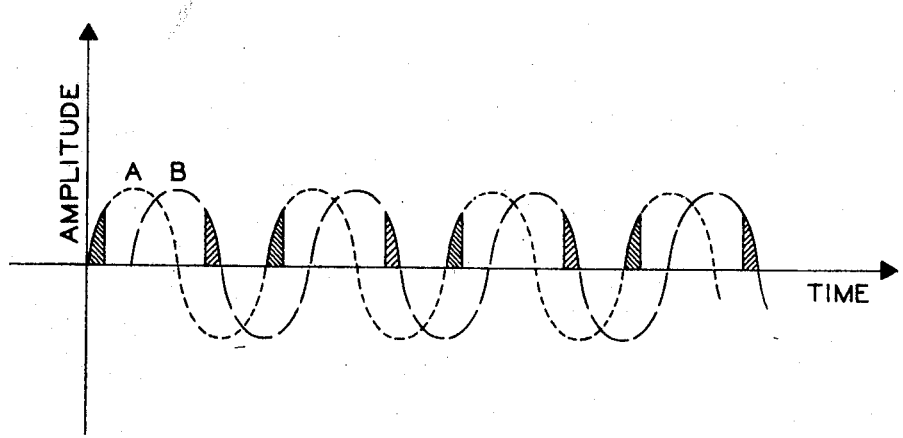
FIG. 4 is a graphical illustration of the waveforms of two sources to be compared for frequency error by the preferred embodiment of the invention.
Figure 5A:
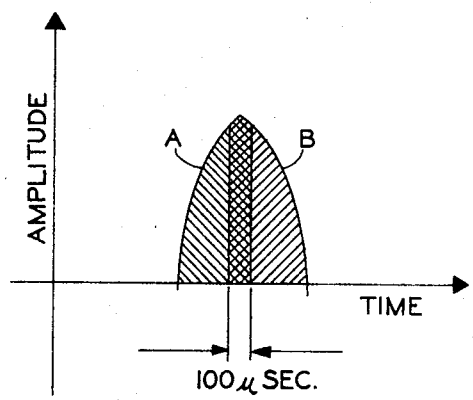
FIG. 5a is a graphical illustration of the condition where source A's frequency is greater than source B's; and, FIG. 5b is a graphical illustration of the condition where source B's frequency is greater than source A's.
Figure 5B:
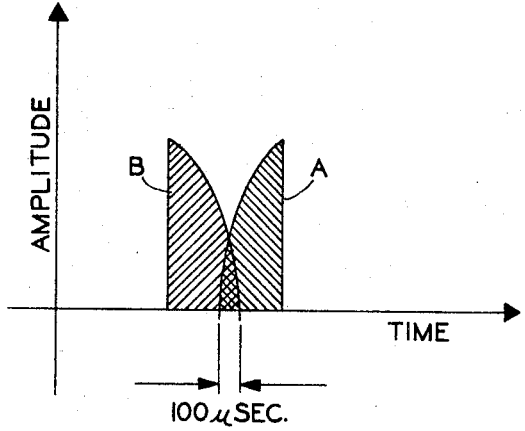

Since the nature of the scheme is to inspect the amplitude of the signal 23 at or near the beginning of the overlap period the trailing portion of signal 23 will provide erroneous information to the high or low level sense circuits and must be eliminated. FIG. 4 graphically illustrates two approximately equal 60 Hz. sine waves (A and B) to be compared for frequency error. In FIG. 4 each cross-hatched area is approximately 1 millisecond wide. Either waveform A or waveform B may drift up or down in frequency and an overlap of dissimilar crosshatches will occur. FIG. 5a is a graphical illustration of the condition where waveform A has a higher frequency than waveform B. FIG. 5b is a graphical illustration of the condition where waveform B has a higher frequency than waveform A. The 100 microsec. cutoff circuit (block 30) cuts off after 100 microseconds of input 29. The effect of blocks 28 and 30 is to pass an output 31 which is 100 microsec. in duration to the low frequency detector 33 and to the level gate 32. The low frequency detector 33 serves to detect the low frequency of the overlapping waveforms (equal to the difference frequency of the two sources) as opposed to the real time rate of 60 hertz/sec. that the signals appear during the period of one overlap which may last several seconds if the frequencies are substantially equal.

The low frequency detector output 34 gates the level gate 32 allowing the input 31 to pass to the high level 36 and low level 37 detect circuits. The amplitude of signal 35 is interrogated by these circuits and one or the other provides an output depending on whether signal 35 is high or low.

A high level detect 36 output 38 acts to disable the low level detect circuit 37 to prevent false outputs from the low level detect circuit 39. The high level detect circuit 36 supplies a command signal 38 to a pre-set motor interval timer 40 (clockwise rotation) and the low level detect circuit 37 supplies a command signal 39 to a preset motor interval timer 41 (counter-clockwise rotation).

Thus, the running interval of the motor is fixed and "jogs" the frequency in a corrective direction each time an error is detected and eventually "slews" the frequency until the errors are at least 28 seconds apart. Each motor interval timer feeds a reset back to its respective level detect at the end of the running interval. This is to prevent lengthening of the running interval in the event of closely spaced commands.

By utilizing both halves of the incoming sine waves 2 and 3 the error direction detector 6 would double its repetition rate and therefore, furnish twice the error corrections per minute. The teachings of the patent is not limited to sine wave inputs and could be applied to any set of repetitive waveforms. The wave shaping blocks 20 and 22 are necessary when repetitive symmetrical waveforms are to be compared in frequency as is the case with two sine waves square waves, triangular waves, etc. Repetitive waveforms of unlike character also can be compared in frequency by the described scheme.

Although a certain and specific embodiment has been illustrated, it is to be understood that modifications may be made without departing from the true spirit and scope of the invention.

What is claimed is:

1. A standby control system for assuring a continuous source of power to a load within predetermined phase and frequency limitations comprising:
    a reference voltage source,
    a primary voltage source,
    an error direction detection means having said reference and said primary source connected thereto,
    said error direction detection means comparing in frequency said two inputs connected thereto and operable to provide an output signal indicative of whether said primary frequency is increasing or decreasing relative to said reference frequency,
    a frequency correction means having said output signal connected thereto,
    a synchronization means connected to said frequency correction means,
    said frequency correction means utilizing said output signal to frequency adjust said synchronization means,
    a null detection means having said error direction detection means, said reference source, and said primary source connected thereto,
    said null detection means operable to determine the existence of an electrical phase null between said reference and said primary sources,
    said synchronization means having said null detection means, said reference source, and said primary source connected thereto,
    said null detection means upon the occurrence of a phase null actuating said synchronization means to synchronize said primary source and said reference source.

2. A standby control system as set forth in claim 1 wherein said system further comprises means having said reference source connected thereto and operable to determine whether said source is within a predetermined maximum-minimum frequency range.

3. A standby control system as set forth in claim 1 wherein said frequency correction means comprises a motor and a variable resistor, said motor mechanically connected to said resistor, said motor varying said resistor in the direction indicated by said output signal.

4. A standby control system as set forth in claim 1 wherein said primary source comprises a static inverter.

5. A standby control system as set forth in claim 1 wherein said system further comprises:
    a timer having said error direction detection means and said null detection means connected thereto,
    said timer being reset by a signal emitted from said error direction detection means,
    said reset signal being emitted from said error direction detection means at the same time as said output signal,
    said timer having a delay period related to a predetermined relative difference in frequency between said sources,
    said timer preventing the operation of said null detection means until said delay has elapsed.

6. A standby control system as set forth in claim 1 wherein said error direction detection means comprises:
    a first wave forming means having said reference source connected thereto,
    a second wave forming means having said primary source connected thereto,
    an "and" circuit having the outputs of said first and said second wave forming means connected thereto,
    said "and" circuit providing an output for the period of time said wave forming outputs are simultaneously present,
    a first level gate having said output of said "and" circuit and said output of said second wave forming means connected thereto,
    said first level gate providing a signal comprising said second wave forming means output during the period of time said "and" circuit is emitting an output,
    a 100 $\mu$sec. delay circuit having said first level gate's output connected thereto,
    said 100 $\mu$sec. delay circuit chopping the first 100 $\mu$sec. off of said waveform from said second wave forming means,
    a 100 $\mu$sec. cut-off circuit having said output of said 100 $\mu$sec. delay circuit connected thereto,
    said 100 $\mu$sec. cut-off circuit cutting off said output of said 100 $\mu$sec. delay circuit after the passing of 100 $\mu$sec.,
    a low frequency detector having said output of said 100 $\mu$sec. cut-off circuit connected thereto,
    a second level gate having the output of said low frequency detector and said output of said 100 $\mu$sec. cut-off circuit connected thereto,
    said second level gate providing a signal comprising said output of said 100 $\mu$sec. cut-off circuit during the time said second level gate is gated on by said low frequency detector,
    a high level detector having the output of said second level gate connected thereto,
    a low level detector having the output of said second level gate, and the output of said high level detector connected thereto,
    said level detectors measuring the amplitude of said output of said second level gate,
    said low level detector being de-activated by said output from said high level detector upon the occurrence of a high amplitude of said output of said second level gate,
    said high and low level detectors connected to said frequency correction means.

7. A standby control system as set forth in claim 6 wherein said first wave forming means comprises means to form a waveshape containing only the leading edge of said reference source.

8. A standby control system as set forth in claim 7 wherein said first wave forming means further comprises means to rectify said reference source.

9. A standby control system as set forth in claim 6 wherein said second wave forming means comprises means to form a waveshape containing only the trailing edge of said primary source.

10. A standby control system as set forth in claim 9 wherein said second wave forming means further comprises means to rectify said primary source.

11. A standby control system as set forth in claim 6 wherein said error direction detection means to reset said high and low level detectors at the end of the time cycle of said frequency correction means.

References Cited

UNITED STATES PATENTS

| | | | |
|---|---|---|---|
| 3,201,592 | 8/1965 | Reinert et al. | 307—64 |
| 3,229,111 | 1/1966 | Schumacher et al. | 307—64 |
| 3,300,651 | 1/1967 | Larsen | 307—64 X |
| 3,337,743 | 8/1967 | Rolfes | 307—64 X |
| 3,339,082 | 8/1967 | Rhyne | 307—64 X |

ROBERT K. SCHAEFER, Primary Examiner

H. J. HOHAUSER, Assistant Examiner

U.S. Cl. X.R.

307—87